United States Patent
Gasko et al.

[11] Patent Number: 5,997,057
[45] Date of Patent: Dec. 7, 1999

[54] BUMPER END CAP

[75] Inventors: David J. Gasko, Rochester; Dennis W. Jalbert, Macomb; Robert L. Stewart, Rochester Hills; Mark R. Fistler, Ray; Tom Morse, Milford; Robert Schwartz, Ann Arbor, all of Mich.

[73] Assignee: Chrysler Corporation, Auburn Hills, Mich.

[21] Appl. No.: 09/061,460

[22] Filed: Apr. 16, 1998

[51] Int. Cl.⁶ .................................................. B60R 19/02
[52] U.S. Cl. .......................................................... 293/102
[58] Field of Search ................... 293/120–122, 293/102

[56] References Cited

U.S. PATENT DOCUMENTS

| | | | |
|---|---|---|---|
| D. 186,215 | 9/1959 | Walker . | |
| D. 281,873 | 12/1985 | Milton | D12/172 |
| 4,066,285 | 1/1978 | Hall et al. . | |
| 4,095,831 | 6/1978 | Hagiwara et al. . | |
| 4,109,951 | 8/1978 | Weller . | |
| 4,193,621 | 3/1980 | Peichl et al. | 293/142 |
| 4,320,913 | 3/1982 | Kuroda | 293/120 |
| 4,350,221 | 9/1982 | Ishima | 180/190 |
| 4,422,680 | 12/1983 | Goupy | 293/122 |
| 4,961,603 | 10/1990 | Carpenter | 293/102 |
| 5,031,947 | 7/1991 | Chen | 293/135 |
| 5,219,197 | 6/1993 | Rich et al. | 293/120 |
| 5,425,561 | 6/1995 | Morgan | 293/120 |
| 5,498,045 | 3/1996 | Morgan | 293/122 |
| 5,780,129 | 7/1998 | Ohta | 293/120 |

FOREIGN PATENT DOCUMENTS

| | | | |
|---|---|---|---|
| 406247237 | 9/1994 | Japan | 293/120 |
| 406305377 | 11/1994 | Japan | 293/120 |

*Primary Examiner*—Dennis H. Pedder
*Attorney, Agent, or Firm*—Lawrence J. Shurupoff

[57] ABSTRACT

A one-piece blow molded bumper end cap is provided for use in combination with a vehicle bumper assembly. The bumper end cap functions as an end plug to enhance air flow into the engine compartment when used in combination with a flow-through bumper. The bumper end cap also includes structural features which improve the crashworthiness of the bumper system in lower speed corner impacts, as well as, higher speed frontal impacts.

17 Claims, 2 Drawing Sheets

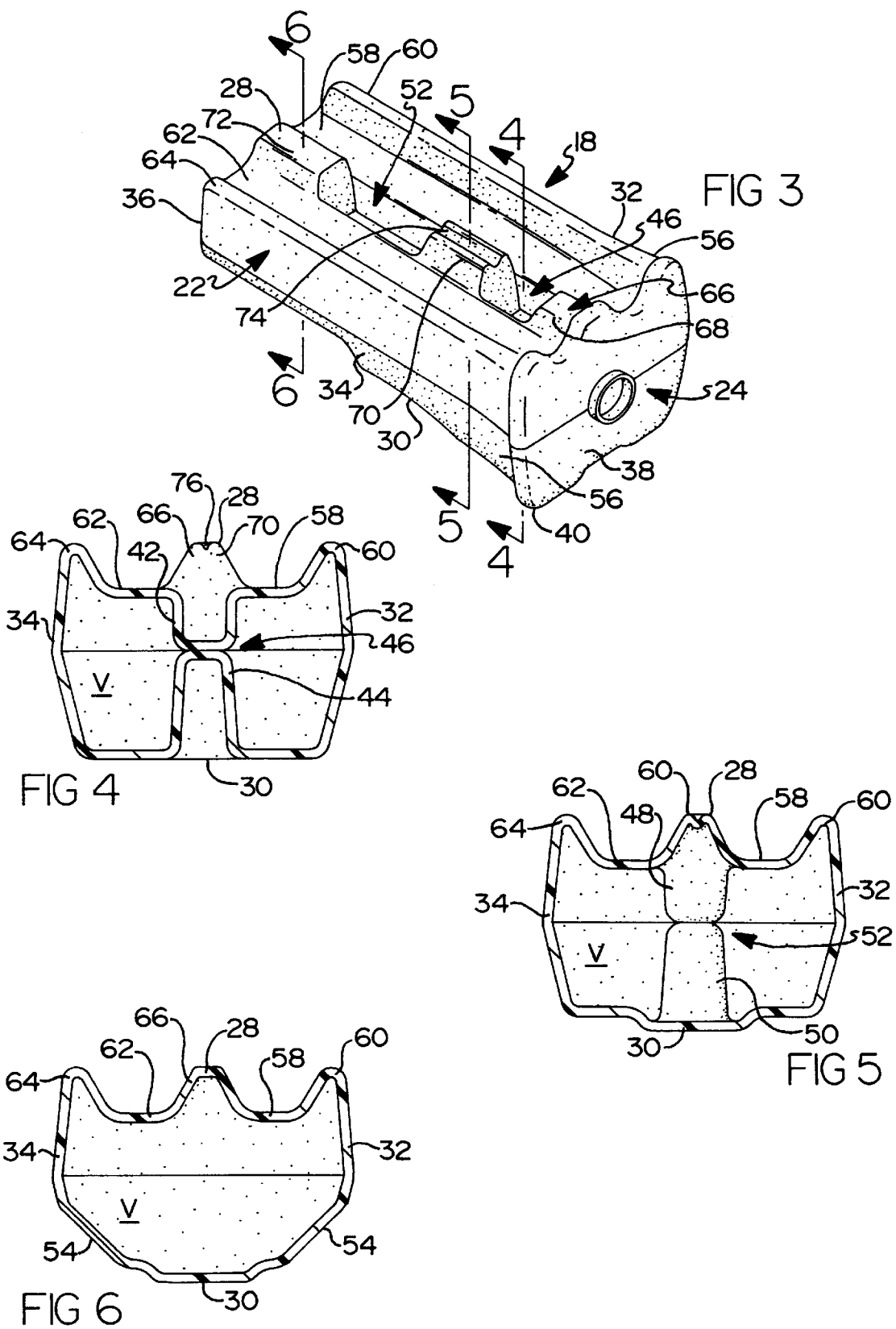

BUMPER END CAP

TECHNICAL FIELD

This invention relates generally to a bumper end cap for use in combination with a vehicle bumper assembly, and more particularly to a one piece blow-molded bumper end cap adapted to be inserted into a bumper assembly.

BACKGROUND OF THE INVENTION

Generally, automotive vehicles have included a bumper assembly to minimize damage to the vehicle during collisions. These bumper assemblies function as impact beams as well as provide some energy absorbing features to enhance the crashworthiness of the vehicle. While bumper assemblies have historically been an exposed feature of the vehicle, current design trends have integrated the bumper assembly with the vehicle body. For example, the bumper assembly may be located behind the front fascia of the vehicle. Current design trends have also been directed to improvements in aerodynamics to substantially reduce the wind resistance of the vehicle.

While these design trends have made the vehicle more visually appealing, they have adversely affected other aspects of the vehicle. As an example, the integrated fascia/bumper assembly may impede the air flow into the engine compartment of the vehicle, thus decreasing the cooling capacity of a radiator associated therewith. In addition, the packaging requirements of the bumper assembly have made it difficult to satisfy certain crashworthiness criteria. Moreover, the location of the bumper assembly behind a body panel can result in increased damage to the vehicle during certain impact situations.

SUMMARY OF THE INVENTION

The present invention is therefore directed to overcoming the disadvantages commonly associated with bumper assemblies which are integrated into the vehicle body. In accordance with the present invention, a preferred embodiment of a bumper end cap is provided for use in combination with a vehicle bumper assembly. The bumper end cap includes a hollow molded body having a first portion adapted to be received within an end of a vehicle bumper and a second portion adapted to engage and cover the end of the bumper. The hollow blow-molded body further includes a plurality of internal strengthening members formed therein to provide additional energy absorbing and load transferring functions of the bumper assembly.

A general object of the present invention is to provide a simple and low cost bumper end cap for use in combination with a vehicle bumper which is easy to manufacture and which enhances the performance of the bumper system. Another object of the invention is to provide a bumper end cap which may be readily manufactured by a blow-molding process which is adapted to conform with particular bumper cross-sections.

A further object of the present invention is to provide a bumper end cap which enhances the bumper performance in a corner impact situation.

Still another object of the invention is to provide a bumper end cap which protects the front fascia of the vehicle from the edge of a bumper during a low speed impact.

Yet another object of the present invention is to provide a bumper end cap which plugs the bumper to prevent air flow out of the ends thereof and direct the air flow into the engine compartment to enhance the cooling capabilities of the vehicle.

Still a further object of the present invention is to provide a bumper end cap which optimizes the load transfer through the bumper assembly into the vehicle structure.

These and other objects and advantages will become more apparent when reference is made to the following drawings and accompanying description.

BRIEF DESCRIPTION OF THE DRAWINGS

FIG. 3 is a detailed perspective view of the bumper end cap shown in FIG. 2;

FIG. 4 is a cross sectional view taken along line 4—4 shown in FIG. 3;

FIG. 5 is a cross sectional view taken along line 5—5 shown in FIG. 3; and

FIG. 6 is a cross sectional view taken along line 6—6 shown in FIG. 3.

BEST MODE OF CARRYING OUT THE INVENTION

Figure 1:
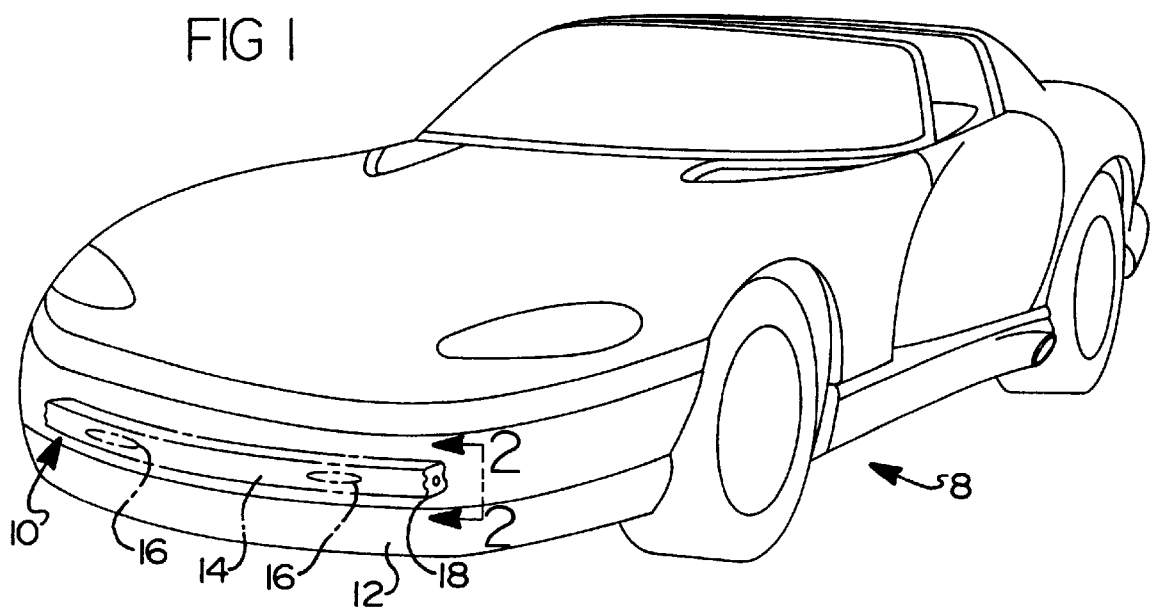
FIG. 1 is a perspective view of an automobile having a front bumper assembly including the bumper end cap of the present invention.

Referring now to the drawings in greater detail, FIG. 1 illustrates an automotive vehicle 8 having a bumper assembly 10 operably disposed between the frame (not shown) and the front fascia 12 of vehicle 8. As presently preferred, bumper assembly 10 includes a bumper 14 and a bumper end cap 18 disposed at each end thereof. Bumper 14 is a generally tubular section having geometric features formed in the wall thereof to provide additional strength during impact events, and, in addition, to provide locations for securing bumper assembly 10 to vehicle 8, as well as providing structural support for the front fascia 12. Bumper 14 includes a plurality of apertures 16 formed in the front and rear walls. In this manner, bumper 14 is a flow-through bumper which directs air impinging on the front of the bumper through the bumper and into the engine compartment of vehicle 8. One skilled in the art should readily recognize that the apertures 16 formed in bumper 14 must be sufficiently sized and spaced to maintain the structural integrity of the bumper while permitting airflow therethrough. As presently preferred, bumper 14 is a steel component fabricated using a roll forming process. However, one skilled in the art will readily recognize that any suitable material and manufacturing process which provides a generally tubular bumper could be utilized, such as a steel hydroforming process or an aluminum extrusion process. Bumper assembly 10 further includes a threaded fastener 20 extending through the wall of bumper 14 to engage and secure bumper end cap 18 in the end thereof. While the preferred embodiment contemplates utilizing threaded fasteners to position and secure bumper end cap 18 within bumper 14, one skilled in the art would readily recognize that other fastening means could by utilized for this function including other mechanical fasteners, such as rivets or pins, or a suitable adhesive operably disposed between bumper end cap 18 and bumper 14.

With reference now to FIGS. 3–6, bumper end cap 18 is a hollow, substantially rectangular member having a first portion 22 which is received within the end of bumper 14 and generally conforms to the cross-section thereof, and a second portion 24 extending from first portion 22 and configured to project over the edge 26 of bumper 14. As presently preferred, bumper end cap 18 is fabricated from a suitable plastic using a blow-molding process. Polyethylene plastic is presently preferred, however other suitable plastics may also be used such as Xenoy available from G.E. Plastics and plastic blends such as PC/PBT, PC/ABS, and ABS. Moreover, the hollow blow-molded component has been found to yield a stronger component which retains the desired structural integrity over other prior art components such as a honeycomb structure.

First portion 22 of bumper end cap 18 includes a front surface 28, a rear surface 30, an upper surface 32 and a lower surface 34. In FIGS. 3–6, bumper end cap 18 has been rotated such that front surface 28 which would be forward facing when appropriately positioned in vehicle 8, is facing upwardly to adequately illustrate the structural features described hereinafter. Second portion 24 of bumper end cap 18 includes an outer end wall 38 disposed on first portion 22 opposite end wall 36. Lip portion 40 is formed about the circumference of outer end wall 38 and is radially extending from first portion 22 to conceal edge 26 of bumper 18. As used herein, the term radially extending refers to the perpendicular distance from a longitudinal axis of the bumper end cap, as commonly used in connection with cylindrical coordinates, and is not intended to be limited to a circular configuration. Moreover, one skilled in the art will readily recognize that second portion 24 could further include a lateral extension projecting outwardly from bumper 14 to further wrap bumper assembly 10 around the side of vehicle 8.

Bumper end cap 18 further includes a plurality of strengthening members formed therein. More specifically, a first hollow strengthening member 42 (FIG. 4) is formed on front surface 28 and projects into the interior volume v defined by first portion 22. A second strengthening member 44 is formed in rear surface 30 and projects into interior volume v defined by first portion 22. First and second strengthening members 42, 44 extend into interior volume v to a position about midway between front and rear surfaces 28, 30 and are juxtaposed in facing relationship within interior volume v to define a first interior column 46 having a generally rectangular cross-section. A third strengthening member 48 (FIG. 5) is formed in front surface 28 and a fourth strengthening member 50 is formed in rear surface 30. Third and fourth strengthening members 48, 50 extend into interior volume v to a position about midway between front and rear surfaces 28, 30 and are juxtaposed in facing relationship within interior volume v to define a second interior column 52 having a generally rectangular cross-section. First and second interior columns 46, 52 function to provide internal support for hollow bumper end cap 18 and to provide additional structure which may be deformed during high speed frontal impacts, thereby adding additional energy absorbing capabilities to bumper assembly 10. Furthermore, first and second interior columns 46, 52 function to provide a load transfer path from bumper assembly 10 to a front frame rail (not shown) of vehicle 8.

Bumper end cap 18 is further configured to facilitate insertion into bumper 14. More specifically, rear surface 30 is generally tapered from inner end wall 36 to second portion 24, thereby allowing bumper end cap 18 to be easily inserted into bumper 14. Upper and lower surfaces 32, 34 also include a chamfer portion 54 proximate to inner end wall 36 to further facilitate insertion of bumper end cap 18 into bumper 14. In addition, upper and lower surfaces 32, 34 include a outwardly tapered or flared portion 56 proximate with outer end wall 38. In this manner, a substantial portion of first portion 22 provides a tolerance fit between bumper end cap 18 and the interior surface of bumper 14 while flared portion 56 of upper and lower surfaces 32, 34 increase the circumferential dimensions of bumper end cap 18 to provide an interference fit with the inner surface of bumper 14.

When inserted into bumper 14, lip portion 40 of second portion 24 and flared portion 56 of first portion 22 cooperate to substantially seal the end of bumper 14. Thus, when used in conjunction with a flow-through bumper, bumper end cap 18 prevents the exhaust of air flow out of the ends of bumper 14, and acts to redirect the air flow through bumper 14 toward the engine compartment of vehicle 8.

Figure 2:
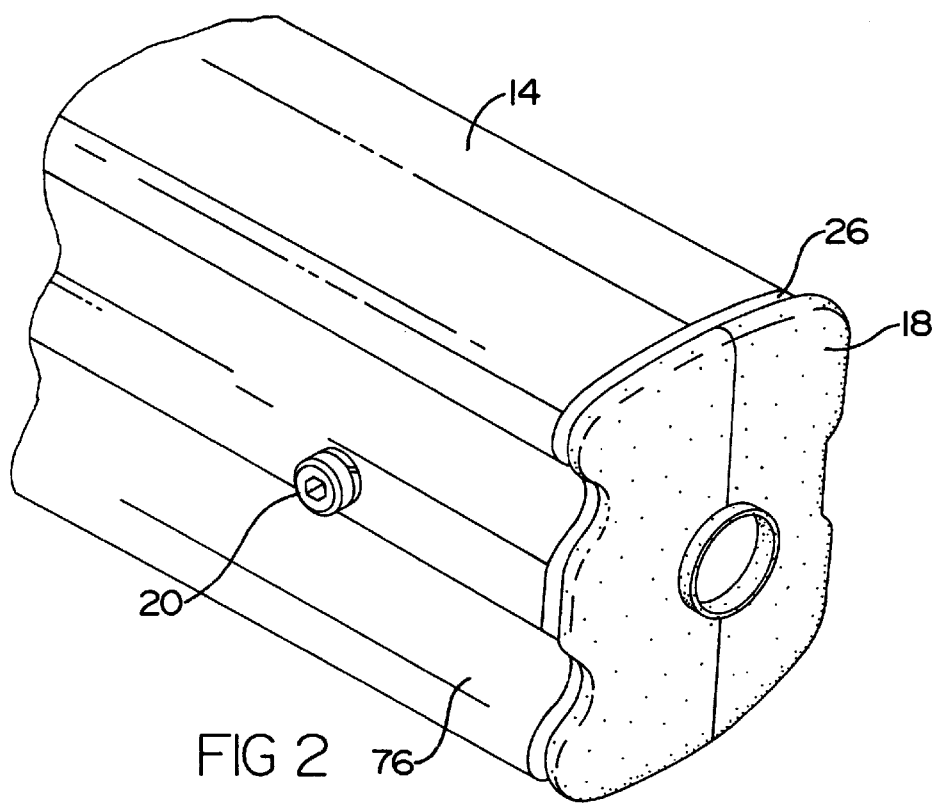
FIG. 2 is a close-up perspective view of the bumper and bumper end cap illustrated in FIG. 1.

Front surface 28 of bumper end cap 18 includes a recess or cove 58 formed therein adjacent upper surface 32 to define a longitudinally extending strengthening rib 60. Similarly, recess or cove 62 is formed in front surface 28 adjacent lower surface 34 to define a longitudinal strengthening rib 64. Cove 58 and cove 60 further form longitudinal strengthening rib 66 formed along the center line of front surface 28 and defining a hump thereon. As best seen in FIG. 2, coves 58, 60 (seen in FIGS. 3–6) conform with contoured surface 76 of bumper 14. First strengthening member 42 and third strengthening member 48 are also formed along the center line of front surface 28 such that first and second interior columns 46, 52 extend from rear surface 30 to longitudinal strengthening rib 66 formed on front surface 28. As such, longitudinal strengthening rib 66 is segregated into distinct strengthening members 68, 70 and 72. A longitudinal fastening groove 74 is formed in member 70 to facilitate installation of threaded fastener 20.

While the present invention has been described in reference to a particular preferred embodiment, one skilled in the art would readily recognize that certain modifications could be made thereto without deviating from the scope of the present invention.

INDUSTRIAL APPLICABILITY

It should be apparent that the present invention provides an end cap adapted for use in the end of a bumper of a motorized vehicle. The bumper end cap improves the crashworthiness of the bumper system in lower speed corner impacts, as well as higher speed frontal impacts. The bumper end cap also enhances air flow into the engine compartment when used in combination with a flow-through bumper.

It should further be apparent that the blow-molded bumper end cap of the present invention can provide significant savings in the manufacturing cost by eliminating expensive tooling and assembly procedures presently experienced in the vehicle manufacturing process.

While but one embodiment of the present invention has been shown and described, other modifications thereof are possible within the scope of the following claims.

What is claimed:

1. An end cap for insertion within an open end portion of a tubular bumper, comprising:

a longitudinally extending hollow molded body insertable within said bumper and having a front surface, a rear surface, an upper surface, a lower surface, an outer end wall and an inner end wall;

a first hollow strengthening member formed on said front surface and projecting into said hollow body;

a second hollow strengthening member formed in said rear surface and projecting into said hollow body such that said first and second strengthening members are juxtaposed in facing relation within said hollow body; and a lip portion extending outwardly about said outer end wall and extending perpendicularly with respect to said longitudinally extending molded body and said tubular bumper for concealing an edge of said tubular bumper and such that said lip substantially seals said open end portion of said tubular bumper when said hollow body is inserted therein.

2. The end cap of claim 1 further comprising a first hollow strengthening rib extending along said front surface adjacent said upper surface, and a second hollow strengthening rib extending along said front surface adjacent said lower surface.

3. The end cap of claim 1 wherein said first and second strengthening members each extend into said hollow body to a position about midway between said front and rear surfaces.

4. The end cap of claim 1 further comprising a third hollow strengthening member formed on said front surface adjacent said first strengthening member and defining a hump on said front surface.

5. The end cap of claim 4 wherein said hump has an installation groove formed therein.

6. The end cap of claim 4 further comprising fourth and fifth strengthening members formed on said front surface on opposite sides of said third strengthening member.

7. The end cap of claim 6 wherein said third, fourth and fifth strengthening members are each aligned centrally along said front surface.

8. A bumper assembly comprising:

a tubular bumper having an inner surface and at least one open end terminating at an edge;

an end cap including an inner end wall, at least one side wall and an outer end wall defining an enclosed interior volume, a first portion of said end cap being inserted into said open end and having a tolerance fit with said inner surface, a second portion of said end cap being inserted into said open end and having an interference fit with said inner surface, and a lip portion extending radially outwardly from said outer end wall and adapted to project over said edge of said tubular bumper.

9. The end cap of claim 8 wherein said end cap is generally tapered from said outer end wall to said inner end wall.

10. The end cap of claim 8 wherein said at least one side wall has a chamfer formed therein.

11. The end cap of claim 8 further comprising a longitudinal strengthening rib formed in said at least one side wall.

12. The end cap of claim 8 further comprising a interior column extending through said enclosed interior volume.

13. The end cap of claim 12 wherein said column comprises a first hollow-strengthening member formed in said at least one side wall and projecting through said enclosed interior volume.

14. The end cap of claim 13 further comprising a longitudinal strengthening rib formed in said at least one side wall.

15. The end cap of claim 8 further comprising said at least one side wall having a cove formed to define a longitudinal strengthening rib.

16. An end cap for insertion within a bumper comprising:

a molded hollow body including a first portion having a front surface, a rear surface, an upper surface, a lower surface and an inner end wall, and a second portion having an outer end wall formed on said first portion and a lip portion extending radially outwardly therefrom, said front surface having a first cove formed therein to define a first longitudinal rib adjacent said upper surface and a second cove formed therein to define a second longitudinal rib adjacent said lower surface, said first and second coves defining a third longitudinal rib along a centerline of said front surface;

a first hollow strengthening member formed on said front surface and projecting into said molded hollow body, and a second hollow strengthening member formed in said rear surface and projecting into said molded hollow body such that said first and second strengthening members are juxtaposed in facing relation with said hollow body to define a first interior column; and a third hollow strengthening member formed on said front surface and projecting into said molded hollow body, and a fourth hollow strengthening member formed in said rear surface and projecting into said molded hollow body such that said third and fourth strengthening members are juxtaposed in facing relation with said hollow body to define a second interior column.

17. The end cap of claim 16 wherein said first portion is generally tapered from said outer end wall to said inner end wall.

* * * * *